United States Patent
Arora et al.

(10) Patent No.: US 11,614,008 B2
(45) Date of Patent: Mar. 28, 2023

(54) AGRICULTURAL MACHINE

(71) Applicant: CirculOil Limited, Brighton (GB)

(72) Inventors: Krishan Arora, Chigwell (GB); Oliver Paul Taylor, Reading (GB)

(73) Assignee: CirculOil Limited, Brighton (GB)

( * ) Notice: Subject to any disclaimer, the term of this patent is extended or adjusted under 35 U.S.C. 154(b) by 332 days.

(21) Appl. No.: 16/627,681

(22) PCT Filed: Jul. 16, 2018

(86) PCT No.: PCT/EP2018/069319
§ 371 (c)(1),
(2) Date: Dec. 30, 2019

(87) PCT Pub. No.: WO2019/016166
PCT Pub. Date: Jan. 24, 2019

(65) Prior Publication Data
US 2021/0293164 A1    Sep. 23, 2021

(30) Foreign Application Priority Data
Jul. 17, 2017 (GB) ..................... 1711475

(51) Int. Cl.
*F01M 11/04* (2006.01)
*H02K 5/20* (2006.01)
(Continued)

(52) U.S. Cl.
CPC ......... *F01M 11/0458* (2013.01); *A01D 69/12* (2013.01); *F01M 11/03* (2013.01);
(Continued)

(58) Field of Classification Search
CPC ............... F01M 11/0458; F01M 11/03; F01M 11/0408; F01M 13/0011;
(Continued)

(56) References Cited

U.S. PATENT DOCUMENTS

2013/0048088 A1 * 2/2013 Miller .................... B01D 35/02
137/1
2013/0111866 A1 5/2013 Schmalz
(Continued)

FOREIGN PATENT DOCUMENTS

DE    102008059277 A1 *  6/2010   ......... B60H 1/00585
JP    2000056084 A   *  2/2000
(Continued)

OTHER PUBLICATIONS

Search Report prepared by the Intellectual Property Office of Great Britain in application No. GB 1711475.2 dated Aug. 14, 2018.
(Continued)

*Primary Examiner* — Jacob M Amick
*Assistant Examiner* — Charles J Brauch
(74) *Attorney, Agent, or Firm* — McDonnell Boehnen Hulbert & Berghoff LLP

(57) ABSTRACT

An agricultural machine, comprising is disclosed, wherein the machine comprises a body frame; a cutting system mounted on the body frame; a drive system mounted on the body frame; a power unit, mounted on the body frame, adapted to provide power to the drive system and/or the cutting system; and a fluid distribution system adapted to provide fluid to the power unit. The fluid distribution system further comprises a dock and a replaceable fluid container adapted to contain fluid to be supplied to the power unit the dock being adapted to retain the replaceable fluid container in fluid communication with the fluid distribution system so as to supply fluid from the replaceable fluid container via the fluid distribution system to the power unit. A method of facilitating an oil change in an agricultural machine is also disclosed.

21 Claims, 2 Drawing Sheets

(51) Int. Cl.
  *A01D 69/12*    (2006.01)
  *F01M 11/03*    (2006.01)
  *F01M 13/00*    (2006.01)
  *H02K 9/193*    (2006.01)
  *H02K 9/26*     (2006.01)
  *A01D 34/44*    (2006.01)
  *A01D 101/00*   (2006.01)

(52) U.S. Cl.
  CPC ..... *F01M 11/0408* (2013.01); *F01M 13/0011* (2013.01); *H02K 5/203* (2021.01); *H02K 9/193* (2013.01); *H02K 9/26* (2013.01); *A01D 34/44* (2013.01); *A01D 2101/00* (2013.01); *H02K 2205/09* (2013.01)

(58) Field of Classification Search
  CPC ............ F01M 2011/0483; A01D 69/12; A01D 34/44; A01D 2101/00; H02K 5/203; H02K 9/193; H02K 9/26; H02K 2205/09; F16N 2210/04; F16N 37/00; F16N 19/00
  See application file for complete search history.

(56) References Cited

U.S. PATENT DOCUMENTS

| | | | |
|---|---|---|---|
| 2013/0160415 A1 * | 6/2013 | Ronning | A01D 43/077 56/13.3 |
| 2017/0089235 A1 | 3/2017 | Dawson et al. | |
| 2017/0101911 A1 * | 4/2017 | Barnes | F01M 11/04 |

FOREIGN PATENT DOCUMENTS

| | | | | |
|---|---|---|---|---|
| WO | 2017051015 | 3/2017 | | |
| WO | WO 2017/051013 | 3/2017 | | |
| WO | WO 2017/053755 | 3/2017 | | |
| WO | WO-2017051013 A1 * | 3/2017 | ............ | F01M 11/04 |
| WO | WO-2017053755 A1 * | 3/2017 | ............ | F01M 1/02 |
| WO | WO 2017/108608 | 6/2017 | | |
| WO | WO-2017108608 A1 * | 6/2017 | ......... | B60H 1/00492 |

OTHER PUBLICATIONS

International Preliminary Report on Patentability and Written Opinion prepared by the International Bureau of WIPO in International Application No. PCT/EP2018/069319 dated Jan. 21, 2020.

* cited by examiner

AGRICULTURAL MACHINE

CROSS REFERENCE TO RELATED APPLICATIONS

This application is a National Phase application of, and claims the benefit of, International (PCT) Application No. PCT/EP2018/069319, filed Jul. 16, 2018, which claims priority to GB Patent Application No. 1711475.2, filed Jul. 17, 2017, each of which is hereby incorporated by reference in its entirety.

This invention relates to an agricultural machine that comprises a body frame, a cutting system mounted on the body frame, a drive system mounted on the body frame, a power unit adapted to provide power to the drive system, and/or the cutting system, and a fluid distribution system adapted to provide fluid to the power unit.

Agricultural machinery employing small internal combustion engines is well known, for example, tractors, combine harvester and ride-on grass cutting machines. Each of these requires a quantity of oil to be carried within the machine in order to lubricate the engine. Typically this is done using a wet sump system, where the engine retains a certain oil level within the sump at all times. After a period of use defined either by time or by the amount of use of the engine this oil requires replacement. To do this the sump must be drained of the used oil and then charged with fresh oil, a process that requires manual removal of a sealing mechanism from the machinery, such as a plug, and waiting until all of the oil has been drained down from the sump. During use of the machinery the level of oil may decrease due to minor leaks or breakdown of the chemical structure of the oil due to repeated heating cycles and wear of engine components. Consequently maintaining the level of clean oil within the engine is critical to its optimum use.

An alternative engine set up is a dry-sump engine, where rather than keeping oil within the engine sump clean oil and used oil are stored in remote oil tanks and pumped between the tank and the engine during use. Again, draining such systems is manually intensive and time-consuming, and the correct volume of oil must be available to be pumped into an engine at all times.

Maintaining sufficient oil of the correct quality within an engine can therefore be a challenging task. The oil itself can also be relatively costly, and required in volumes of several tens of litres for large agricultural machines. Smaller machines may still consume several litres of oil both in use and in oil changes. Typically an oil change is carried out during a service by skilled personnel who have experience in the draining and charging both wet and dry sump systems. One further issue is that used oil is particularly hazardous and requires careful disposal to prevent any harm to persons carrying out the oil change or the environment. This can be impractical for certain types of machinery, for example, it is not possible to take a tractor or a grass cutting machine to a dealership or garage for an oil change to be carried out. And doing this elsewhere carries this risk of both health and environmental issues occurring.

It would be very helpful if at least some of these issues could be ameliorated.

Embodiments of the present invention aim to do so by providing, in a first aspect, an agricultural machine, comprising: a body frame; a cutting system mounted on the body frame; a drive system mounted on the body frame; a power unit, mounted on the body frame, adapted to provide power to the drive system and/or the cutting system; and a fluid distribution system adapted to provide fluid to the power unit; wherein the fluid distribution system further comprises a dock and a replaceable fluid container adapted to contain fluid to be supplied to the power unit the dock being adapted to retain the replaceable fluid container in fluid communication with the fluid distribution system so as to supply fluid from the replaceable fluid container via the fluid distribution system to the power unit.

In a second aspect, embodiments of the present invention provide a method of facilitating a power unit fluid change in an agricultural machine, the agricultural machine comprising a dock in fluid connection with the power unit fluid system and a replaceable fluid container, the dock being adapted to retain the replaceable fluid container, comprising: un-docking the replaceable fluid container; removing the replaceable fluid container from the machine; inserting a new replaceable fluid container into the dock; and engaging the new replaceable fluid container with the dock.

In a third aspect, embodiments of the present invention provide for the use of a replaceable oil container to facilitate an oil change in a grass cutting machine.

The present invention will now be described by way of illustrative example only, and with reference to the accompanying drawings, in which.

Embodiments of the present invention offer the advantage of making the process of changing an engine lubricating oil in an agricultural machine, such as a grass cutting machine, cleaner and easier than using existing methods. No heaving lifting or other specialist equipment or expertise is required to carry out the lubricating oil change. In addition, it is possible to set the embodiments of the present invention up to contain sufficient lubricant for the engine to reach its next oil drain service without requiring any topping up of lubricating oil external to the system during use.

Embodiments of the present invention have taken the approach that a replaceable fluid container adapted to contain fluid to be supplied to the motor, the replaceable fluid container being in fluid communication with the fluid distribution system so as to supply fluid from the replaceable fluid container via a fluid distribution system to a power unit. A dock is provided and adapted to retain the replaceable fluid container. The use of a replaceable container therefore enables a user to carry out a simple oil change process by un-docking the replaceable fluid container, removing the replaceable fluid container from the machine, inserting a new replaceable fluid container into the dock and engaging the new replaceable fluid container with the dock. For a wet sump system this may also require fluid to be pumped from the fluid system of the power unit into a replaceable fluid container until the fluid system is empty; and fluid to be pumped from the replaceable fluid container into the fluid system of the power unit. For a dry sump system the replaceable fluid container may comprise two separate inner chambers, one for retaining used fluid and one for retaining fresh fluid. These and other aspects of the present invention are described in more detail below, using the example of a grass cutting machine as an illustrative embodiment.

Figure 1:
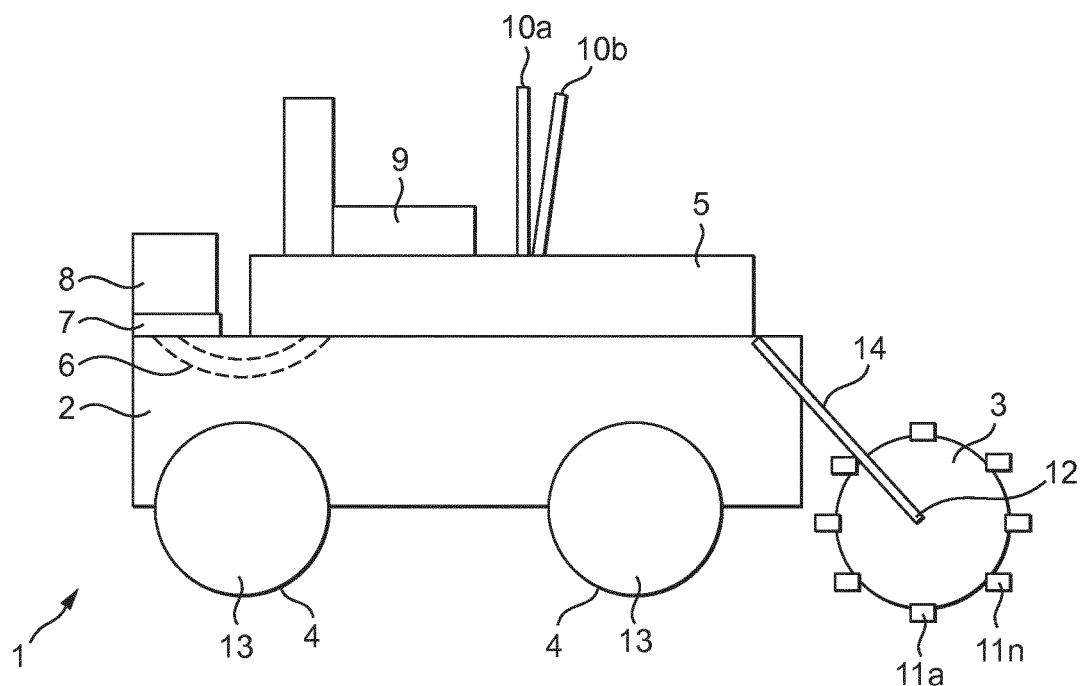
FIG. 1 is a schematic side view of an agricultural machine in accordance with embodiments of the present invention.

FIG. 1 is a schematic side view of an agricultural machine in accordance with embodiments of the present invention. An agricultural vehicle 1 comprises a body frame 2 and a cutting system 3 mounted on the body frame. A drive system 4 is mounted on the body frame 1, along with a power unit 5, which is adapted to provide power to the drive system 4 and/or the cutting system 3. A fluid distribution system 6 (a portion of which is shown in dashed lines in FIG. 1 to illustrate the approximate position since this is internal to the machine) is also present, adapted to provide fluid to the power unit 5. The fluid distribution system 6 further comprises a dock 7 and a replaceable fluid container 8. The dock 7 is adapted to retain the replaceable fluid container 8 in fluid communication with the fluid distribution system 6 so as to supply fluid from the replaceable container 8 via the fluid distribution system 6 to the power unit 5. Along with the main drive and cutting components FIG. 1 also illustrates a seat 9 for a driver to sit in whilst driving the machine 1, and a pair of drive handles 10a, 10b provided to enable the driver to direct power from the power unit to the drive system 4 on each side of the machine 1. This provides for forward and reverse motion for each side of the drive system 4 to move independently of the other, which also creates a turning motion. Such an embodiment is purely illustrative, other steering mechanisms are known. In this example the cutting system comprises at least one blade adapted to cut grass— with a plurality of blades 11a-11n mounted on a rotating shaft 12 positioned at the front of the machine 1. The drive system 4 comprises two pairs of wheels 13a-13d on opposite sides of the machine 1, although alternatively a continuous track may be used. The shaft 12 carrying the blades 11a-11n can be raised and lowered by means of lifting arms 14a, 14b controllable by the driver, such that when the machine 1 is travelling over ground that does not need grass cutting the blades 11a-11g can be moved safely away, and then lowered in to position and in contact with grass when required. Such grass cutting machines are popular in applications where large areas of grass require regular cutting, such as sports facilities, parks and meadowland. Then replacement fluid container 8 and dock 7 are illustrated in more detail in FIG. 2 described below.

Figure 2:
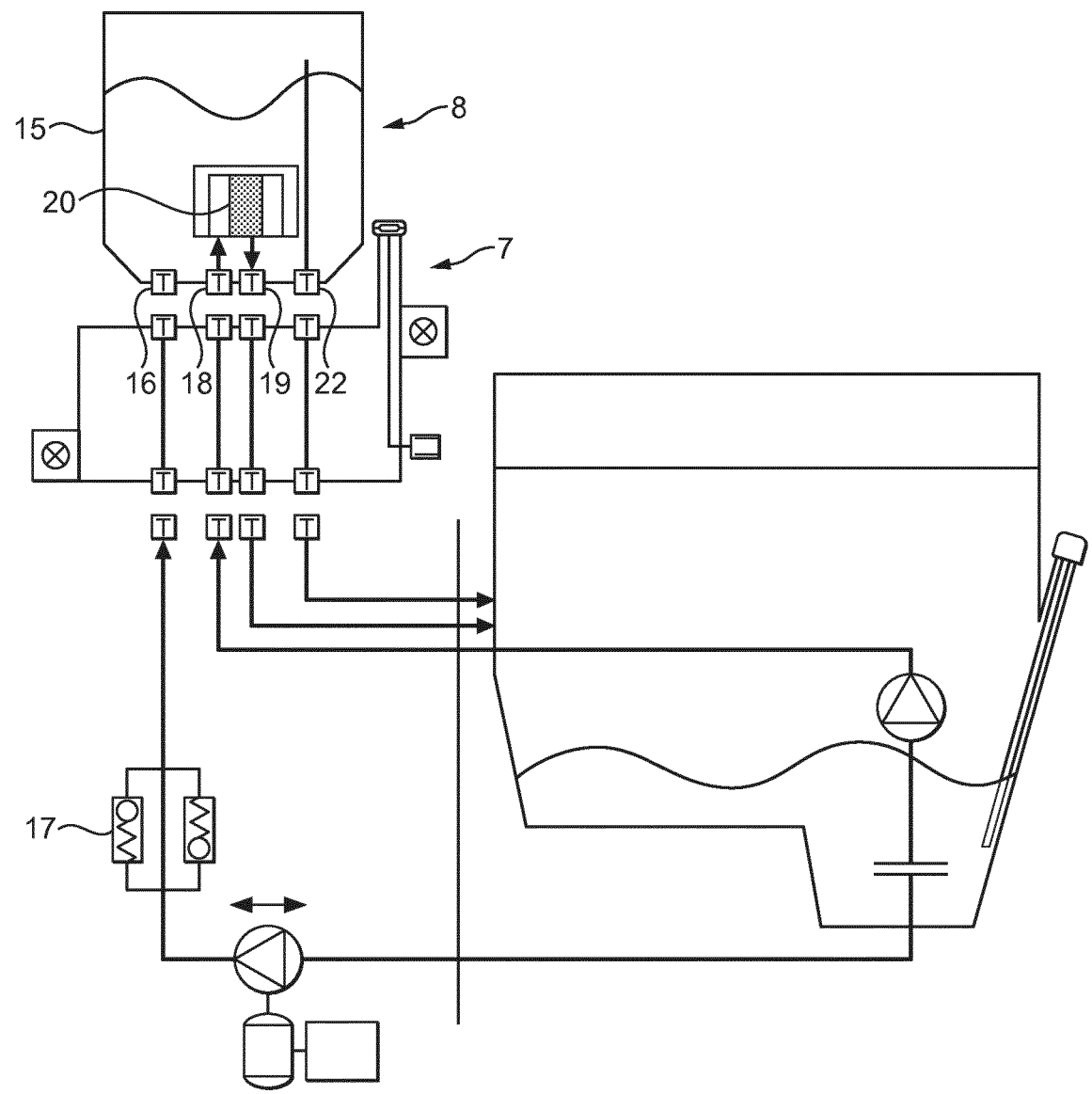
FIG. 2 is a schematic cross-sectional view of a replaceable fluid container and dock in accordance with embodiments of the present invention.

FIG. 2 is a schematic cross-section of a replaceable fluid container and dock in accordance with embodiments of the present invention. In this example the replaceable fluid container 8 is designed for use with a wet sump system for the power unit 5. The replaceable fluid container 8 comprises a housing 15, which is adapted to make a friction fit with the dock 7. The replaceable fluid container 8 also comprises transfer valve 16, both being mounted adjacent one another on the portion of the housing 15 adapted to make a friction fit with the dock 7. The transfer valve 16 is connected to a transfer pump (17) such that fluid from a full replaceable fluid container 8 can be pumped into an empty power unit 5 and vice versa. The container 8 comprises a power unit inlet 18, a power unit outlet 19 and a filter 20. The power unit inlet 18 and outlet 19 are positioned such that fluid received from the power unit 5 enters the replaceable fluid container 8 via the filter and that fluid to the power unit leaves the replaceable fluid container 8 via the filter 20. The power unit inlet 18 and the power unit outlet 19 are connected to a power unit pump 21, such that during use, oil to be filtered for re-use is pumped out of the power unit 5 into the filter 20, and oil to be re-used is pumped out of the filter 20 and into the power unit 5. The transfer valve 17, the power unit outlet 19 and the power unit inlet 18 each comprise push-fit connectors, and the dock 7 comprises mating connectors connected to the fluid distribution system 6 of the machine 1. Each mating connector is adapted to engage with a corresponding push-fit connector and to make a fluid tight seal. Dry break valves are particularly suitable for this purpose.

The housing 15 further comprises a breather valve 22, which is adapted to connect the interior of the replaceable fluid container 8 with a headspace of the power unit 5 to maintain atmospheric pressure within the replaceable fluid container 8 regardless of any fluid flow into or out of the replaceable fluid container 8. As an alternative to this, the housing 15 may further comprise a vent (not shown), wherein the vent is adapted to connect the interior of the replaceable fluid container 8 with the surrounding atmosphere.

The replaceable fluid container 8 may also comprise locking means for engaging with the dock 7 to hold the replaceable fluid container 8 into the dock 7 in use. The replaceable fluid container 8 may further comprise a handle (not shown) to enable insertion of the replaceable fluid container 8 into and removal of the replaceable fluid container 8 into and from the machine 1, and wherein movement of the handle causes the push-fit connectors to engage to and dis-engage with the mating connectors.

The replaceable fluid container 8 is preferable made from recyclable and/or reusable materials. These include many plastics materials and reinforced plastics materials, such as nylon, that may be recycled easily or are robust enough to be reused several times.

Preferably, the power unit 5 of the machine 1 is an engine, and the fluid in the replaceable fluid container 8 is an engine lubricant. This includes typical engine lubricants for petrol or diesel driven four stroke engines or two stroke engines. The power unit 5 may be used to drive the drive system 4 or the cutting system 3 or both of the drive system 4 and the cutting system 3. One or other of the drive system 4 or the cutting system 3 may work mechanically (merely by the motion of the machine 1 across the ground) or be driven by an alternative power source. The power unit 5 could alternatively be a motor, such as an electric motor, and the fluid a lubricant or a cooling fluid as required.

Typically the dock is positioned at the rear of the vehicle, as shown in FIG. 1. This makes access by the driver or other personnel performing an oil change easy and faster than in traditional systems. Alternatively the replaceable fluid container 8 may be positioned in any convenient position on or in the machine 1. In the case of a wet sump system the sump power unit 5, the fluid in the replaceable fluid container 13 can be pumped into the sump initially using a transfer pump to charge the sump with fluid, and then used periodically to top up the sump either manually (using a dip stick and valve) or automatically (using a fluid level sensor and a valve) to ensure the correct level of fluid in the sump at all times. When all of the fluid has been pumped out of the replaceable fluid container 13 and it therefore requires changing, or when all of the fluid remaining in the fluid distribution system has been used at least once, all of the used fluid in the sump can be pumped back into the replaceable fluid container by reversing the transfer pump. For a dry sump system, the replaceable fluid container may 8 work in the same manner except topping up a remote oil tank rather than the sump itself, be one of a pair of replaceable fluid containers 8a, 8b used in tandem to provide fluid to a dry sump system, or the replaceable fluid container 8 may comprise two chambers in a single housing 15, one for fresh fluid and one for used fluid. The replaceable fluid container 8 may also be provided with a dosing chamber, to enable dosing of the fluid with certain additives throughout the period of time the replaceable fluid container 8 remains in situ in the machine.

The method by which an oil change may be facilitated will now be described. Starting with a machine in which a replaceable fluid container 8 is in situ but requires changing, the first step comprises un-docking the replaceable fluid container. The second step comprises removing the replaceable fluid container from the machine, and the fourth step inserting a new replaceable fluid container into the dock. The final step is one of engaging the new replaceable fluid container with the dock. In embodiments where it is necessary to pump fluid out of the sump, an initial step includes pumping fluid from the fluid system of the power unit into a replaceable fluid container until the fluid system is empty. Once the replaceable fluid container 8 is in place, a final step includes pumping fluid from the replaceable fluid container into the fluid system of the power unit. The step of engaging the new replaceable fluid container with the dock may comprise positioning the new replaceable fluid container in the dock; moving the handle to engage the push-fit connectors of the new replaceable fluid container with the corresponding mating connectors on the dock, such that the new replaceable fluid container is engaged with the dock. Un-docking the replaceable fluid container 8 may comprise the steps of moving the handle of the replaceable fluid container to dis-engage the push-fit connectors and the mating connectors; and lifting the replaceable fluid container out of the dock. Once removed from the dock 7, the dry break valves used in the push-fit connectors seal the replaceable fluid container 8 such that no used fluid can escape, and in the case of a new replaceable fluid container 8, ensure that no fresh fluid can escape. Therefore the oil change process is one that can be done by drivers of the machine 1 and no special training or disposal kit is required to enable this. Once used, the replaceable fluid container 8 can be sent for recycling to a dealership or other authorised party.

The replaceable fluid container 8 is preferably made from a plastics or reinforced plastics material that is able to withstand both the fluid pressures and temperatures of the fluid and engine proximity and maintain its structure to ensure that no fluid leaks during any collision of the agricultural vehicle or crushing of the replaceable fluid container 8. The replaceable fluid container 8 may also comprise a controller unit to control the flow of fluid into and out of the replaceable fluid container 8. The controller may comprise a processor and a memory to store information about the fluid, fluid flow or fluid quality. The controller may be able to communicate with an engine controller in the machine 1. The replaceable fluid container 8 also comprises a level sensor to indicate when the fluid within the replaceable fluid container has reached a critical level. The push-fit connectors are made of suitable materials such as stainless steel. The agricultural vehicle 1 may be a lawn mowing or grass cutting machine, a combine harvester, a tractor or any other machinery employing a cutting system.

Other embodiments in accordance with the present invention will be apparent to those skilled in the art based upon the dependent claims.

The invention claimed is:

1. An agricultural machine, comprising:
a body frame;
a cutting system mounted on the body frame;
a drive system mounted on the body frame;
a power unit, mounted on the body frame, adapted to provide power to the drive system or the cutting system; and
a fluid distribution system adapted to provide fluid to the power unit;
wherein
the fluid distribution system further comprises a dock and a replaceable fluid container adapted to contain fluid to be supplied to the power unit, the dock being adapted to retain the replaceable fluid container in fluid communication with the fluid distribution system so as to supply fluid from the replaceable fluid container via the fluid distribution system to the power unit, the replaceable fluid container comprises a housing, a power unit inlet, a power unit outlet and a filter,
the housing adapted to make a friction fit with the dock and a transfer valve,
the power unit inlet and power unit outlet being positioned such that fluid from the power unit enters the replaceable fluid container via the filter, and that fluid to the power unit leaves the replaceable fluid container via the filter,
the power unit outlet being distinct from the power unit inlet.

2. The machine as claimed in claim 1, wherein the transfer valve is connected to a transfer pump, such that fluid from a full replaceable fluid container can be pumped into an empty power unit and vice versa.

3. The machine as claimed in claim 1, wherein the power unit inlet and the power unit outlet are connected to a power unit pump, such that during use, oil to be filtered for re-use is pumped out of the power unit into the filter, and oil to be re-used is pumped out of the filter and into the power unit.

4. The machine as claimed in claim 1, wherein the housing further comprises a breather valve or a vent, the breather valve adapted to connect the interior of the replaceable fluid container with a headspace of the power unit to maintain atmospheric pressure within the replaceable fluid container regardless of any fluid flow into or out of the replaceable fluid container, and the vent adapted to connect the interior of the replaceable fluid container with the surrounding atmosphere.

5. The machine as claimed in claim 1, wherein the replaceable fluid container is made from recyclable or reusable materials.

6. The machine as claimed in claim 1, wherein the replaceable fluid container also comprises locking means for engaging with the dock to hold the replaceable fluid container in position in the dock in use.

7. The machine as claimed in claim 1, wherein the transfer valve, the power unit outlet and the power unit inlet comprise push-fit connectors, wherein the dock comprises mating connectors connected to the fluid system of the machine, each mating connector being adapted to engage with a corresponding push-fit connector, the push-fit connectors including dry break valves.

8. The machine as claimed in claim 1, wherein the replaceable fluid container further comprises a handle to enable insertion and removal into the machine, and wherein movement of the handle causes the push-fit connectors to engage to and disengage with the mating connectors.

9. The machine as claimed in claim 1, wherein the power unit is an engine and the fluid is an engine lubricant, or the power unit is a motor and the fluid is a lubricant or a cooling fluid.

10. The machine as claimed in claim 1, wherein the cutting system comprises at least one blade adapted to cut grass, and the drive system comprises at least two wheels or a continuous track mounted on the body frame.

11. Method of facilitating a power unit fluid change in an agricultural machine as claimed in claim 1, the method comprising:
Un-docking the replaceable fluid container;
Removing the replaceable fluid container from the machine;
Inserting a new replaceable fluid container into the dock; and
Engaging the new replaceable fluid container with the dock.

12. Method as claimed in claim 11, further comprising pumping fluid from the fluid system of the power unit into a replaceable fluid container until the fluid system is empty; and pumping fluid from the replaceable fluid container into the fluid system of the power unit.

13. Method as claimed in claim 12, wherein the replaceable fluid container comprises a transfer valve, wherein the transfer valve, power unit inlet valve and power unit outlet valves comprise push fit connectors.

14. Method as claimed in claim 13, wherein the dock comprises mating connectors corresponding to the push-fit connectors and in fluid connection with the fluid system of the power unit, such that each push-fit connector engages with a mating connector.

15. Method as claimed in claim 14, wherein the replaceable fluid container further comprises a handle to enable insertion and removal into the machine, and wherein movement of the handle causes the push-fit connectors to engage to and dis-engage with the mating connectors.

16. Method as claimed in claim 15, wherein the step of un-docking the replaceable fluid container comprises the steps of:
   Moving the handle of the replaceable fluid container to dis-engage the push-fit connectors and the mating connectors; and
   Lifting the replaceable fluid container out of the dock.

17. Method as claimed in claim 15, wherein the step of engaging the new replaceable fluid container with the dock comprises:
   Positioning the new replaceable fluid container in the dock; and
   Moving the handle to engage the push-fit connectors of the new replaceable fluid container with the corresponding mating connectors on the dock, such that the new replaceable fluid container is engaged with the dock.

18. Method as claimed in claim 11, wherein the power unit is an engine and the fluid is engine lubricant.

19. Use of a replaceable oil container to facilitate an oil change in an agricultural machine as claimed in claim 1.

20. The machine as claimed in claim 1, wherein the replaceable fluid container further includes a dosing chamber adapted to enable dosing of the fluid with one or more additives.

21. The machine as claimed in claim 1, wherein the replaceable fluid container has two inner chambers, one of the inner chambers being adapted to receive used fluid and the other of the inner chambers being adapted to receive fresh fluid.

* * * * *